United States Patent
Hijiya et al.

(10) Patent No.: US 11,548,807 B2
(45) Date of Patent: Jan. 10, 2023

(54) SODA LIME GLASS SHEET

(71) Applicant: AGC Inc., Chiyoda-ku (JP)

(72) Inventors: Hiroyuki Hijiya, Tokyo (JP); Kensuke Nagai, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 799 days.

(21) Appl. No.: 16/388,208

(22) Filed: Apr. 18, 2019

(65) Prior Publication Data

US 2019/0241461 A1    Aug. 8, 2019

Related U.S. Application Data

(63) Continuation of application No. PCT/JP2017/037587, filed on Oct. 17, 2017.

(30) Foreign Application Priority Data

Oct. 21, 2016 (JP) .............. JP2016-206717
May 16, 2017 (JP) .............. JP2017-096950

(51) Int. Cl.
    C03C 3/095    (2006.01)
    C03C 3/087    (2006.01)
    C03C 4/08     (2006.01)

(52) U.S. Cl.
    CPC .............. C03C 3/095 (2013.01); C03C 3/087 (2013.01); C03C 4/08 (2013.01); *C03C 2204/00* (2013.01)

(58) Field of Classification Search
    CPC .................. C03C 3/087; C03C 3/095
    See application file for complete search history.

(56) References Cited

U.S. PATENT DOCUMENTS

| | | |
|---|---|---|
| 2002/0169064 A1 | 11/2002 | Nagashima |
| 2003/0216242 A1 | 11/2003 | Arbab et al. |
| 2007/0054796 A1 | 3/2007 | Shelestak et al. |
| 2012/0289394 A1 | 11/2012 | Nagai et al. |
| 2017/0029317 A1 | 2/2017 | Shimada et al. |
| 2018/0037491 A1 | 2/2018 | Hijiya et al. |

FOREIGN PATENT DOCUMENTS

| | | |
|---|---|---|
| CN | 1364148 A | 8/2002 |
| EP | 2 530 058 A1 | 12/2012 |
| JP | 2002-338298 A | 11/2002 |
| JP | 2003-502258 | 1/2003 |
| JP | 2009-507753 | 2/2009 |
| WO | WO 2015/170759 A1 | 11/2015 |
| WO | WO 2016/171141 A1 | 10/2016 |

OTHER PUBLICATIONS

International Search Report dated Jan. 9, 2018 in PCT/JP2017/037587 filed Oct. 17, 2017 (with English Translation).
Written Opinion dated Jan. 9, 2018 in PCT/JP2017/037587 filed Oct. 17, 2017.
Extended European Search Report dated May 19, 2020 in corresponding European Patent Application No. 17862004.3, citing document AO therein, 10 pages.

*Primary Examiner* — Elizabeth A. Bolden
(74) *Attorney, Agent, or Firm* — Oblon, McClelland, Maier & Neustadt, L.L.P.

(57) ABSTRACT

A soda lime glass plate has, on the basis of oxides, a total sulfur content in terms of $SO_3$ of 0.001 to 0.2% in mass %, a total iron content in terms of $Fe_2O_3$ of 0.15 to 0.4% in mass %, and a total tin content in terms of $SnO_2$ of 0.02 to 1% in mass %, and has a mass proportion of a divalent iron in terms of $Fe_2O_3$ in the total iron in terms of $Fe_2O_3$ of 45 to 70%. The soda lime glass plate has, as a conversion value for a 3.85 mm-thickness glass plate, a visible light transmittance Tv_A of 70% or more, a total solar transmittance Ts of 63.7% or less, and c* in the L*a*b* color space of 4 or less.

16 Claims, No Drawings

SODA LIME GLASS SHEET

TECHNICAL FIELD

The present invention relates to a soda lime glass plate, and particularly a soda lime glass plate having high heat-insulating property.

BACKGROUND ART

Soda lime glass having high heat-insulating property (the soda lime glass may be hereinafter simply referred to as a "glass") is required to be used as window glasses of vehicles such as automobiles. When the glass has low heat-insulating property, the temperature inside vehicles receiving solar radiation increases. The temperature increase not only makes passengers uncomfortable, but also increases cooling load, leading to the deterioration of fuel consumption.

Total solar transmittance (Tts) specified in ISO-13837A:2008 is an index of heat-insulating property of a glass. Low Tts means low transmittance of solar energy, that is, high heat-insulating property. Solar direct transmittance (Te) specified in ISO-13837A:2008 is an index that is correlated with Tts, and those have the relationship that Tts decreases as Te decreases.

Window glasses of vehicles are required to have high visible light transmittance from the standpoint of visibility and safety. In safety standards of Road Transport Vehicle Act, front windshield of automobiles is required to have visible light transmittance of 70% or more. Visible light transmittance (Tv_A) specified in JIS R3106:1998 is an index of the visible light transmittance.

Patent Literature 1 describes a heat-absorbing glass plate having Te of 50% or less as a conversion value for a 4 mm-thickness glass plate. The Tv_A of the heat-absorbing glass plate is more than 65% as a conversion value for a 4 mm-thickness glass plate.

CITATION LIST

Patent Literature

Patent Literature 1: WO 2015/170759 A1

SUMMARY OF THE INVENTION

Technical Problem

Iron is present as divalent iron or trivalent iron in a glass. The divalent iron has an absorption peak in the vicinity of a wavelength of 1100 nm and the trivalent iron has an absorption peak in the vicinity of a wavelength of 400 nm. In order to decrease Tts and increase heat-insulating property while maintaining high visible light transmittance of a glass, it is considered that the content of the divalent iron that allows light in a visible light region to transmit and allows light in an infrared region to absorb should be increased. In order to achieve this, it is considered that the proportion (redox ratio) of the divalent iron to total iron is increased. However, increasing the redox ratio brings about an unfavorable result that amber color is generated in a glass by the reduction of sulfur (S) contained as a fining component. In order to avoid the generation of amber color, the addition of tin (Sn) could be effective. However, Sn is expensive and when the amount thereof added is increased, volatilization of Sn is increased in production line. Therefore, the amount of Sn added has limitations. Furthermore, inappropriate amount of Sn could adversely affect the redox ratio of iron. Thus, the respective components have the respective advantages and restrictions and affect each other. Therefore, it has been difficult to find an optimum balance of those components.

Furthermore, iron can provide the action of decreasing Tts as described above, but acts as a coloring component. As a result, conventional high heat-insulating glasses were colored green or blue. However, the coloration is not always preferable as window glasses of vehicles.

The present invention has an object to provide a soda lime glass plate having high heat-insulating property and high visible light transmittance and at the same time having gray color closer to achromatic color.

Solution to Problem

The present invention includes the following aspects.

[1] A soda lime glass plate, having:
a total sulfur content in terms of $SO_3$ of 0.001 to 0.2% in mass % on the basis of oxides;
a total iron content in terms of $Fe_2O_3$ of 0.15 to 0.4% in mass % on the basis of oxides;
a total tin content in terms of $SnO_2$ of 0.02 to 1% in mass % on the basis of oxides;
a mass proportion of a divalent iron in terms of $Fe_2O_3$ in the total iron in terms of $Fe_2O_3$ of 45 to 70%;
a visible light transmittance Tv_A specified in JIS R3106:1998 of 70% or more as a conversion value for a 3.85 mm-thickness glass plate;
a total solar transmittance Tts specified in ISO-13837A:2008 of 63.7% or less as a conversion value for a 3.85 mm-thickness glass plate; and
c* in the L*a*b* color space specified in JIS Z8781-4:2013 of 4 or less as a conversion value for a 3.85 mm-thickness glass plate.

[2] The soda lime glass plate according to the above [1], having a Se content of 5 to 20 ppm in mass ppm.

[3] The soda lime glass plate according to the above [1] or [2], having a total cobalt content in terms of CoO of 0 to 15 ppm in mass ppm on the basis of oxides.

[4] The soda lime glass plate according to any one of the above [1] to [3], wherein a parameter H defined as follows satisfies the relationship of 140≤H≤350, $$H=\{491\times[Fe^{2+}]+54.8\times[Fe^{3+}]-17.2\times[SnO_2]-45.2\times[CeO_2]+130\times[SO_3]-0.390\times[CoO]+0.608\times[Se]-3.95\}\times[\text{Thickness}]$$

wherein $[Fe^{2+}]$ is a $Fe^{2+}$ content in terms of $Fe_2O_3$ in mass %, $[Fe^{3+}]$ is a $Fe^{3+}$ content in terms of $Fe_2O_3$ in mass %, $[SnO_2]$ is the total tin content in terms of $SnO_2$ in mass %, $[CeO_2]$ is a total cerium content in terms of $CeO_2$ in mass %, $[SO_3]$ is the total sulfur content in terms of $SO_3$ in mass %, $[CoO]$ is a total cobalt content in terms of CoO in mass ppm, $[Se]$ is a selenium content in mass ppm, and [Thickness] is a thickness of the glass plate in mm.

[5] The soda lime glass plate according to any one of the above [1] to [4], wherein a parameter Σ defined as follows satisfies the relationship of Σ≤25, $$\Sigma=[CoO]+6.4\times[MgO]$$

wherein [CoO] is a total cobalt content in terms of CoO in mass ppm, and [MgO] is a MgO content in mass %.

[6] The soda lime glass plate according to any one of the above [1] to [5], having an ultraviolet transmittance Tuv specified in ISO-9050:2003 of 35% or less as a conversion value for a 3.85 mm-thickness glass plate.

[7] The soda lime glass plate according to any one of the above [1] to [6], having a total cerium content in terms of $CeO_2$ of 0.1 to 2.0% in mass % on the basis of oxides.

[8] The soda lime glass plate according to any one of the above [1] to [7], having a total titanium content in terms of $TiO_2$ of 0.001 to 0.8% in mass % on the basis of oxides.

[9] The soda lime glass plate according to any one of the above [1] to [8], containing, in mass % on the basis of oxides:

$SiO_2$: 65 to 78%;
$Al_2O_3$: 0 to 5%;
CaO: 5 to 12%;
MgO: 0 to 10%;
$Na_2O$: 5 to 18%; and
$K_2O$: 0 to 5%.

The soda lime glass plate according to any one of the above [1] to [9], having a coordinate in the L*a*b* color space specified in JIS Z8781-4:2013 which satisfies the following relationships as a conversion value for a 3.85 mm-thickness glass plate, −4≤a*≤1, and −1≤b*≤4.

[11] The soda lime glass plate according to any one of the above [1] to [10], having:

an excitation purity Pe specified in JIS Z8701:1999 of 2.5% or less as a conversion value for a 3.85 mm-thickness glass plate; and a dominant wavelength Dw of transmitted light specified in JIS Z8701:1999 of 485 nm to 565 nm as a conversion value for a 3.85 mm-thickness glass plate.

[12] The soda lime glass plate according to any one of the above [1] to [11], having a solar direct transmittance Te specified in ISO-13837A:2008 of 66% or less as a conversion value for a 3.85 mm-thickness glass plate.

Advantageous Effects of the Invention

According to the embodiments of the present invention, a soda lime glass plate having high heat-insulating property and high visible light transmittance and having gray color, by which amber coloration is prevented while preventing bubbles by the action of a fining agent, can be provided.

DESCRIPTION OF EMBODIMENTS

Terms used in the present description are described. Unless otherwise indicated, the definition of the terms provided hereinafter is applied throughout the present description and the claims.

The expression "(value) to (value)" showing the numerical range means that the first value and the second value are included as the lower limit and the upper limit, respectively.

The total iron content is indicated by the amount of $Fe_2O_3$. All of iron present in a glass is not always present as trivalent iron ($Fe^{3+}$), and divalent iron ($Fe^{2+}$) is also present. Mass proportion (percentage) of divalent iron in terms of $Fe_2O_3$ in the total iron in terms of $Fe_2O_3$ is called Fe-Redox.

The Fe-Redox is calculated by the following formula.

Fe-Redox (%)=(0.0486×$\alpha_{1140\ nm}$−0.0175)/[$Fe_2O_3$]

In the formula, $\alpha_{1140\ nm}$ is an absorption coefficient (unit: $cm^{-1}$) at a wavelength of 1140 nm and [$Fe_2O_3$] is the total iron content (unit: mass %) in terms of $Fe_2O_3$.

Similarly, a total sulfur content, a total cobalt content, a total tin content, a total cerium content and a total titanium content are indicated by amounts of $SO_3$, CoO, $SnO_2$, $CeO_2$ and $TiO_2$, respectively.

The visible light transmittance Tv_A is a visible light transmittance determined by measuring transmittance by a spectrophotometer in accordance with JIS R3106:1998. Precalculated weighting functions use values of standard Illuminant A and 2° visual field. In the present description, the visible light transmittance is indicated by a conversion value for a 3.85 mm-thickness plate.

The conversion value for a 3.85 mm-thickness plate used herein means a value obtained by measuring a refractive index of a glass plate, transmittance of which has been measured, and converting the value of the glass plate (the visible light transmittance Tv_A) into the value in terms of 3.85 mm plate thickness by the reflectivity of the glass plate calculated from the refractive index using Sellmeier equation, considering multiple reflection.

The total solar transmittance Tts is specified in ISO-13837A:2008. In the present description, the total solar transmittance is indicated by a conversion value for a 3.85 mm-thickness plate.

The solar direct transmittance Te is specified in ISO-13837A:2008. In the present description, the solar direct transmittance is indicated by a conversion value for a 3.85 mm-thickness plate.

The ultraviolet transmittance Tuv is an ultraviolet transmittance determined by measuring a transmittance by a spectrophotometer in accordance with ISO-9050:2003. In the present description, the ultraviolet transmittance is indicated by a conversion value for a 3.85 mm-thickness plate.

SDF (Skin Damage Factor) is one index of ultraviolet cut and is specified in ISO-9050:2003. In the present description, SDF is indicated by a conversion value for a 3.85 mm-thickness plate.

L*a*b* color space is based on the standard specified in JIS Z8781-4:2013 (using standard Illuminant D65 and 2° visual field). X, Y and Z coordinates (XYZ color system) are determined from transmittance spectrum of a glass sample, and can be converted into a*b* coordinate. c* is obtained from the following formula: c*={$(a*)^2+(b*)^2$}$^{1/2}$. Saturation decreases as c* decreases. That is, a glass becomes gray. In the present description, c* is indicated by a conversion value for a 3.85 mm-thickness plate.

The excitation purity Pe is excitation purity determined in accordance with JIS Z8701:1999. In the present description, the excitation purity is indicated by a conversion value for a 3.85 mm-thickness plate.

The Dominant wavelength Dw of transmitted light is dominant wavelength of transmitted light determined in accordance with JIS Z8701:1999. In the present description, the dominant wavelength is indicated by a conversion value for a 3.85 mm-thickness plate.

"Soda lime glass" means a glass containing $SiO_2$ as a main component and further containing $Na_2O$ and CaO, as generally understood by one skilled in the art. Each component and property of the soda lime glass according to the embodiment of the present invention are described below.

The soda lime glass plate according to the embodiment of the present invention contains iron (Fe). The iron has the action of decreasing Tts and Tv_A and further acts as a coloring component of blue, green or yellow. Window glasses of vehicles are required to have low Tts, but are not desirable that Tv_A decreases or coloration occurs. Therefore, it has been conventionally difficult to find an optimum range of Fe content, considering the balance with other components and other factors.

In the soda lime glass plate according to the embodiment of the present invention, the total iron (hereinafter simply referred to as $Fe_2O_3$) content in terms of $Fe_2O_3$ is 0.15 to 0.4% in mass % on the basis of oxides. When the $Fe_2O_3$ content is 0.15% or more, Tts can be sufficiently reduced. The $Fe_2O_3$ content is preferably 0.2% or more, more preferably 0.22% or more and still more preferably 0.24% or more. On the other hand, when the $Fe_2O_3$ content is 0.4% or less, Tv_A can be sufficiently increased. The $Fe_2O_3$ content is preferably 0.37% or less, more preferably 0.35% or less, still more preferably 0.32% or less, still further preferably 0.3% or less, particularly preferably 0.28% or less and most preferably 0.25% or less.

The Fe-Redox affects Tts as described above and is also related to the generation of amber color. It has conventionally been difficult to determine the optimum Fe-Redox in consideration of a balance with the $Fe_2O_3$ amount, $SO_3$ amount described hereinafter and other elements.

The Fe-Redox in the soda lime glass plate according to the embodiment of the present invention is 45 to 70%. When the Fe-Redox is 45% or more, Tts can be sufficiently reduced. The Fe-Redox is preferably 47% or more, more preferably 49% or more, still more preferably 51% or more, still further preferably 53% or more, particularly preferably 55% or more and most preferably 57% or more. On the other hand, when the Fe-Redox is 70% or less, a melting step of a glass does not become complicated and the generation of amber color by reduction of sulfur is difficult to occur. The Fe-Redox is preferably 67% or less, more preferably 64% or less, still more preferably 63% or less and particularly preferably 61% or less. It is understood by one skilled in the art that the Fe-Redox can be adjusted by, for example, adjusting the amount of a reducing agent or oxidizing agent added.

The soda lime glass plate according to the embodiment of the present invention contains sulfur (S). The sulfur is mainly derived from salt cake ($Na_2SO_4$) used as a fining agent.

In the soda lime glass plate according to the embodiment of the present invention, the total sulfur (hereinafter simply referred to as $SO_3$) content in terms of $SO_3$ is 0.001 to 0.2% in mass % on the basis of oxides. When the $SO_3$ content is 0.001% or more, the fining effect during glass melting is improved and the generation of bubbles is reduced. The $SO_3$ content is preferably 0.003% or more, more preferably 0.01% or more and still more preferably 0.02% or more. When the $SO_3$ content is 0.2% or less, amber coloration is sufficiently prevented. The $SO_3$ content is preferably 0.1% or less, more preferably 0.05% or less and still more preferably 0.03% or less.

The soda lime glass plate according to the embodiment of the present invention contains a tin (Sn) component for the purpose of prevention of amber coloration and refining. Sn acts as an oxidizing agent, and therefore contributes to the adjustment of Fe-Redox. In the soda lime glass plate according to the embodiment of the present invention, the total tin (hereinafter referred to as $SnO_2$) content in terms of $SnO_2$ is 0.02 to 1% in mass % on the basis of oxides. When the $SnO_2$ content is 0.02% or more, amber coloration is prevented and fining property is satisfactory. The $SnO_2$ content is preferably 0.1% or more, more preferably 0.15% or more, still more preferably 0.2% or more and particularly preferably 0.3% or more. When the $SnO_2$ content is 1% or less, raw material cost can be reduced and volatilization in production line is decreased. The $SnO_2$ content is preferably 0.7% or less, more preferably 0.5% or less, still more preferably 0.45% or less and particularly preferably 0.4% or less.

The soda lime glass plate according to the embodiment of the present invention may contain selenium (Se). Se is a red coloring component and is a component reducing Pe. Additionally, Se has an action of decreasing c* in the soda lime glass plate according to the embodiment of the present invention.

In the soda lime glass plate according to the embodiment of the present invention, the Se content is preferably 5 ppm or more in mass ppm (0.0005% or more in mass %), more preferably 6 ppm or more, still more preferably 7 ppm or more, further preferably 8 ppm or more and particularly preferably 10 ppm or more. Addition of Se in excessive amount leads to the possibility of decreasing Tv_A described hereinafter and is not preferable from the standpoint of cost. The Se content is preferably 20 ppm or less, more preferably 17 ppm or less, still more preferably 15 ppm or less and particularly preferably 14 ppm or less.

The soda lime glass plate according to the embodiment of the present invention may contain cobalt (Co) in addition to selenium. Co is a blue coloring component and has the action of reducing c* and Pe together with Se. It has been found that controlling the amounts of Se and Co added in combination with $Fe_2O_3$ to an extremely narrow range is particularly useful in decreasing c* while maintaining heat-insulating property and visible light transmittance.

In the soda lime glass plate according to the embodiment of the present invention, when Co is contained, the total cobalt (hereinafter simply referred to as CoO) content in terms of CoO is preferably 2 ppm or more in mass ppm on the basis of oxides (0.0002% or more in mass %), more preferably 3 ppm or more and still more preferably 4 ppm or more. When CoO is excessively added, there is the possibility that Tv is decreased, and the glass may be colored blue. The CoO content is preferably 15 ppm or less, more preferably 10 ppm or less, still more preferably 8 ppm or less, still further preferably 6 ppm or less and particularly preferably 5 ppm or less.

The soda lime glass plate according to the embodiment of the present invention may contain cerium (Ce). Cerium provides the action of decreasing ultraviolet transmittance.

In the soda lime glass plate according to the embodiment of the present invention, the total cerium (hereinafter simply referred to as $CeO_2$) content in terms of $CeO_2$ is preferably 0.1% or more, more preferably 0.15% or more, still more preferably 0.25% or more and particularly preferably 0.3% or more, in mass % on the basis of oxides. Ce is expensive and when the amount thereof is too large, visible light transmittance is decreased. Therefore, the $CeO_2$ content is preferably 2.0% or less, more preferably 1.0% or less, still more preferably 0.5% or less and particularly preferably 0.4% or less.

The soda lime glass plate according to the embodiment of the present invention may contain titanium (Ti). Ti provides the action of absorbing ultraviolet rays similar to cerium, but the degree of absorbing ultraviolet rays is lower as compared with cerium, and Ti is inexpensive as compared with cerium.

In the soda lime glass plate according to the embodiment of the present invention, the total titanium (hereinafter simply referred to as $TiO_2$) content in terms of $TiO_2$ is preferably 0.001% or more, more preferably 0.002% or more and still more preferably 0.01% or more, in mass % on the basis of oxides. Ti absorbs not only ultraviolet rays but visible light. Therefore, the content thereof is preferably 0.8% or less, more preferably 0.1% or less, still more preferably 0.05% or less and particularly preferably 0.02% or less.

The soda lime glass plate according to the embodiment of the present invention may further contain coloring component(s) such as $MnO_2$, MnO, $Cr_2O_3$, $V_2O_5$, NiO or $Er_2O_3$ other than the above-described components, but may not contain the coloring components. The soda lime glass plate according to the embodiment of the present invention preferably does not substantially contain $MnO_2$, MnO, $Cr_2O_3$, $V_2O_5$, NiO and $Er_2O_3$ (excluding the case where those are contained as unavoidable impurities). The term "does not substantially contain" in the present description means that the total content of MnO2 and MnO is 0.0015 mass % or less (preferably 0.001% or less and more preferably 0.0005% or less), the contents of $Cr_2O_3$ and NiO are 0.0015 mass % or less (preferably 0.001% or less and more preferably 0.0005% or less), respectively, the content of $V_2O_5$ is 0.01 mass % or less (preferably 0.005% or less and more preferably 0.003% or less), and the content of $Er_2O_3$ is 0.008 mass % or less (preferably 0.005% or less and more preferably 0.003% or less).

The soda lime glass plate according to the embodiment of the present invention preferably contains, in mass % on the basis of oxides:

$SiO_2$: 65 to 78%;
$Al_2O_3$: 0 to 5%;
CaO: 5 to 12%;
MgO: 0 to 10%;
$Na_2O$: 5 to 18%; and
$K_2O$: 0 to 5%.

$SiO_2$ is a main component of the soda lime glass plate.

When the $SiO_2$ content is 65% or more, weather resistance is improved, which is preferred. The $SiO_2$ content is preferably 67% or more, more preferably 68% or more, still more preferably 69% or more and particularly preferably 70% or more. When the $SiO_2$ content is 78% or less, devitrification is difficult to occur, which is preferred. The $SiO_2$ content is preferably 77% or less, more preferably 76% or less, still more preferably 75% or less, still further preferably 74.8% or less, particularly preferably 74% or less and most preferably 72% or less.

$Al_2O_3$ is a component improving weather resistance.

The $Al_2O_3$ content is 0% or more. When $Al_2O_3$ is contained, weather resistance is improved. The $Al_2O_3$ content is preferably 0.1% or more, more preferably 0.2% or more, still more preferably 0.3% or more, particularly preferably 0.4% or more and most preferably 0.5% or more. When the $Al_2O_3$ content is 5% or less, meltability is improved, which is preferred. The $Al_2O_3$ content is preferably 4% or less, more preferably 3.5% or less, still more preferably 2% or less, particularly preferably 1.3% or less and most preferably 1% or less.

CaO is a component promoting melting of glass raw materials and improving weather resistance.

When the CaO content is 5% or more, meltability and weather resistance are improved, which are preferred. The CaO content is preferably 6% or more, more preferably 7% or more, still more preferably 8% or more, particularly preferably 8.5% or more and most preferably 9% or more. When the CaO content is 12% or less, devitrification is difficult to occur, which is preferred. The CaO content is preferably 11.5% or less and more preferably 11% or less.

MgO is a component promoting melting of glass raw materials and improving weather resistance.

The MgO content is 0% or more. When MgO is contained, meltability and weather resistance are improved. The MgO content is preferably 0.1% or more, more preferably 0.2% or more, still more preferably 0.3% or more and particularly preferably 0.5% or more. When the MgO content is 10% or less, devitrification is difficult to occur, which is preferred. The MgO content is preferably 8% or less, more preferably 6% or less, still more preferably 4% or less, particularly preferably 2% or less and most preferably 1% or less.

$Na_2O$ is a component promoting melting of glass raw materials.

When the $Na_2O$ content is 5% or more, meltability is improved, which is preferred. The $Na_2O$ content is preferably 8% or more, more preferably 11% or more, still more preferably 13% or more and particularly preferably 13.5% or more. When the $Na_2O$ content is 18% or less, weather resistance is improved, which is preferred. The $Na_2O$ content is preferably 16% or less, more preferably 15% or less, still more preferably 14% or less and particularly preferably 13.8% or less.

$K_2O$ is a component promoting melting of glass raw materials.

The $K_2O$ content is 0% or more. When $K_2O$ is contained, meltability is improved. The $K_2O$ content is preferably 0.05% or more, more preferably 0.1% or more and still more preferably 0.15% or more. When the $K_2O$ content is 5% or less, weather resistance is improved, which is preferred. The $K_2O$ content is preferably 3% or less, more preferably 2% or less, still more preferably 1.5% or less, particularly preferably 1% or less and particularly preferably 0.5% or less.

The visible light transmittance Tv_A of the soda lime glass plate according to the embodiment of the present invention is 70% or more as a conversion value for a 3.85 mm-thickness glass plate. The Tv_A is preferably 71% or more and more preferably 72% or more, as a conversion value for a 3.85 mm-thickness glass plate.

The soda lime glass plate according to the embodiment of the present invention has the total solar transmittance Tts of 63.7% or less as a conversion value for a 3.85 mm-thickness glass plate and therefore has high heat-insulating property. The Tts is preferably 63.5% or less, more preferably 63.0% or less, still more preferably 62.0% or less and particularly preferably 61.0% or less.

The solar direct transmittance Te of the soda lime glass plate according to the embodiment of the present invention is preferably 66% or less, more preferably 60% or less, still more preferably 55% or less, still further preferably 52% or less and particularly preferably 50% or less, as a conversion value for a 3.85 mm-thickness glass plate.

Window glasses of vehicles play a role of protecting human bodies and fixtures in vehicles from ultraviolet rays. The ultraviolet transmittance Tuv of the soda lime glass plate according to the embodiment of the present invention is preferably 35% or less, more preferably 33% or less, still more preferably 32% or less and particularly preferably 31% or less, as a conversion value for a 3.85 mm-thickness glass plate.

The SDF (Skin Damage Factor) of the soda lime glass plate according to the embodiment of the present invention is preferably 10% or less. The SDF is more preferably 9% or less, still more preferably 8% or less and particularly preferably 7% or less.

The soda lime glass plate according to the embodiment of the present invention has c* in the L*a*b* color space of 4 or less as a conversion value for a 3.85 mm-thickness glass plate. Therefore, the soda lime glass plate is gray with reduced colorations of blue, green and amber. The glass is easy to look gray as c* is small. The c* is preferably 3.8 or less, more preferably 3.6 or less and particularly preferably 3.5 or less.

The a* is preferably −4 to 1 as a conversion value for a 3.85 mm-thickness glass plate. The a* may be −3.9 or more and may be −3.8 or more. Furthermore, the a* may be 0 or less, may be −1 or less and may be −2 or less.

The b* is preferably −1 to 4 as a conversion value for a 3.85 mm-thickness glass plate. The b* may be −0.5 or more and may be 0 or more. Furthermore, the b* may be 3 or less, may be 2.5 or less and may be 2 or less.

It is particularly preferred that the a* is −4 to 1 and the b* is −1 to 4, as a conversion value for a 3.85 mm-thickness glass plate.

The excitation purity Pe of the soda lime glass plate according to the embodiment of the present invention is preferably 2.5% or less as a conversion value for a 3.85 mm-thickness glass plate. The Pe is more preferably 2.0% or less, still more preferably 1.7% or less and particularly preferably 1.5% or less.

The dominant wavelength Dw of transmitted light of the soda lime glass plate according to the embodiment of the present invention is preferably 485 nm to 565 nm as a conversion value for a 3.85 mm-thickness glass plate. The Dw is more preferably 490 nm or more, still more preferably 495 nm or more and particularly preferably 500 nm or more. Furthermore, the Dw is more preferably 550 nm or less, still more preferably 530 nm or less and particularly preferably 510 nm or less.

In the embodiment of the present invention, in order to obtain a glass plate having desired gray color, a parameter Π defined by "Π=Tv_A×c*" is preferably 350 or less. Even in a case where the c* is large, a glass plate is easy to look gray as Tv_A is small. This is due to human subjectivity. The Π is more preferably 330 or less, still more preferably 310 or less and particularly preferably 300 or less.

A glass plate is easy to look gray as the area thereof is small. This is due to human subjectivity. The reason for this is that a scene around a glass plate is easy to be looked as the area of the glass plate is small, both the around scene and the glass are seen, and as a result, the color of the glass is difficult to be recognized. The area of the main surface of the glass plate is preferably 4 m$^2$ or less. When the area of the glass plate is 4 m$^2$ or less, the glass plate further looks gray. The area of the glass is more preferably 3 m$^2$ or less, still more preferably 2.5 m$^2$ or less and particularly preferably 2 m$^2$ or less.

In the embodiment of the present invention, in order to obtain a glass plate having the desirable visible light transmittance, total solar transmittance, ultraviolet transmittance, gray color and fining property in good balance, it is preferred to adjust the parameter H defined as follows so as to satisfy the requirement of 140≤H≤350.

H={491×[Fe$^{2+}$]+54.8×[Fe$^{3+}$]−17.2×[SnO$_2$]−45.2×[CeO$_2$]+130×[SO$_3$]−0.390×[CoO]+0.608×[Se]−3.95}×[Thickness]

In the above formula, [Fe$^{2+}$] is the Fe$^{2+}$ content in terms of Fe$_2$O$_3$ in mass %, [Fe$^{3+}$] is the Fe$^{3+}$ content in terms of Fe$_2$O$_3$ in mass %, [SnO$_2$] is the total tin content in terms of SnO$_2$ in mass %, [CeO$_2$] is the total cerium content in terms of CeO$_2$ in mass %, [SO$_3$] is the total sulfur content in terms of SO$_3$ in mass %, [CoO] is the total cobalt content in terms of CoO in mass ppm, [Se] is the selenium content in mass ppm and [Thickness] is a thickness of a glass plate in mm.

The parameter H is more preferably 150 or more, still more preferably 160 or more and particularly preferably 170 or more. The parameter H is more preferably 330 or less, still more preferably 320 or less and particularly preferably 310 or less.

In the embodiment of the present invention, in order to obtain a glass plate having small c* and desirable gray color, it is preferred to adjust the parameter Σ defined as follows so as to satisfy the requirement of Σ≤25.

Σ=[CoO]+6.4×[MgO]

In the above formula, [CoO] is the total cobalt content in terms of CoO in mass ppm, and [MgO] is the MgO content in mass %.

The parameter Σ is more preferably 24 or less, still more preferably 20 or less, particularly preferably 18 or less and most preferably 16 or less.

The soda lime glass plate according to the embodiment of the present invention can be manufactured by general methods known by one skilled in the art. For example, the soda lime glass plate can be manufactured by preparing glass raw materials so as to have the above-described final composition, melting those raw materials at 1400 to 1550° C. in a melting furnace to obtain a molten glass, and molding the molten glass.

Examples

The embodiment of the present invention is specifically described below by reference to examples, but the present invention is not construed as being limited to those examples.

Cases 1 to 30 and 38 to 51 are Examples, and Cases 31 to 37 and 52 are Comparative Examples. Cases 31, 32 and 33 correspond to Cases 2, 4 and 6 described in Patent Literature 1, respectively.

Raw materials were put in a platinum crucible so as to have the respective glass compositions shown in Tables 1 to 4 below and melted at 1550° C. for 2 hours. Each melt thus obtained was cast on a carbon plate and gradually cooled, thereby manufacturing a plate of a soda lime glass. Both sides of the plate obtained were polished to obtain a glass plate having a thickness of 3.85 mm.

The blank in the Tables means that the component is not substantially contained.

TABLE 1

|  | Case 1 | Case 2 | Case 3 | Case 4 | Case 5 | Case 6 | Case 7 | Case 8 |
|---|---|---|---|---|---|---|---|---|
| SiO$_2$ (mass %) | 69.7 | 69.6 | 69.6 | 69.6 | 69.5 | 69.5 | 69.4 | 69.5 |
| Al$_2$O$_3$ (mass %) | 3.5 | 3.5 | 3.5 | 3.5 | 3.5 | 3.5 | 3.5 | 3.5 |
| MgO (mass %) | 0.3 | 0.3 | 0.3 | 0.3 | 0.3 | 0.3 | 0.3 | 0.3 |
| CaO (mass %) | 9.6 | 9.6 | 9.6 | 9.6 | 9.6 | 9.6 | 9.6 | 9.6 |
| Na$_2$O (mass %) | 14.6 | 14.6 | 14.7 | 14.6 | 14.6 | 14.6 | 14.6 | 14.7 |
| K$_2$O (mass %) | 1.5 | 1.5 | 1.5 | 1.5 | 1.5 | 1.5 | 1.5 | 1.5 |
| Fe$_2$O$_3$ (mass %) | 0.253 | 0.252 | 0.226 | 0.225 | 0.224 | 0.226 | 0.245 | 0.244 |
| TiO$_2$ (mass %) | 0.002 | 0.001 | 0.002 | 0.001 | 0 | 0.002 | 0.001 | 0.001 |
| SnO$_2$ (mass %) | 0.19 | 0.19 | 0.19 | 0.19 | 0.34 | 0.35 | 035 | 0.33 |
| CeO$_2$ (mass %) | 0.42 | 0.42 | 0.44 | 0.44 | 0.44 | 0.44 | 0.44 | 0.34 |
| SO$_3$ (mass %) | 0.020 | 0.021 | 0.019 | 0.020 | 0.022 | 0.022 | 0.021 | 0.017 |
| CoO (mass ppm) | 8.6 | 7.1 | 5.5 | 6.0 | 7.1 | 7.0 | 6.6 | 5.0 |

TABLE 1-continued

|  | | | | | | | | |
|---|---|---|---|---|---|---|---|---|
| Se (mass ppm) | 8.3 | 6.0 | 8.6 | 10.1 | 10.9 | 10.5 | 11.2 | 13.4 |
| Fe-Redox (%) | 48.8 | 58.3 | 60.6 | 59.9 | 60.8 | 60.0 | 61.2 | 61.5 |
| Tv_A (JIS R3106: 1998) (%) | 72.8 | 71.1 | 72.5 | 70.9 | 73.0 | 72.8 | 71.8 | 71.5 |
| Te (ISO-13837A: 2008) (%) | 52.7 | 48.9 | 50.6 | 49.9 | 51.2 | 51.1 | 48.9 | 48.8 |
| Tts (ISO-13837: 2008) (%) | 63.5 | 60.8 | 62.0 | 61.5 | 62.4 | 62.4 | 60.8 | 60.7 |
| Tuv (ISO-9050-2003) (%) | 32.1 | 31.2 | 31.1 | 30.0 | 31.6 | 31.5 | 31.2 | 32.8 |
| SDF (ISO-9050: 2003) (%) | 7.5 | 7.3 | 7.2 | 7.0 | 7.4 | 7.3 | 7.2 | 7.6 |
| L* (D65) | 85.8 | 84.9 | 85.5 | 84.7 | 85.9 | 85.7 | 85.2 | 85.1 |
| a* (D65) | −3.3 | −3.7 | −3.8 | −3.4 | −3.6 | −3.6 | −4.0 | −3.9 |
| b* (D65) | 0.3 | 0.7 | 1.1 | 2.0 | −0.2 | −0.1 | 0.3 | 0.7 |
| c* (D65) | 3.4 | 3.8 | 3.9 | 3.9 | 3.6 | 3.6 | 4.0 | 3.9 |
| Dw (nm) | 498 | 501 | 506 | 537 | 495 | 495 | 497 | 501 |
| Pe (%) | 1.6 | 1.5 | 1.2 | 1.3 | 2.1 | 2.0 | 2.0 | 1.6 |
| Parameter H | 176 | 213 | 195 | 195 | 188 | 186 | 216 | 240 |
| Parameter Σ | 10.6 | 9.1 | 7.5 | 8.0 | 9.1 | 9.0 | 8.6 | 6.7 |
| Parameter Π | 245 | 267 | 284 | 276 | 264 | 259 | 287 | 280 |

|  | Case 9 | Case 10 | Case 11 | Case 12 | Case 13 | Case 14 | Case 15 |
|---|---|---|---|---|---|---|---|
| $SiO_2$ (mass %) | 69.5 | 69.5 | 69.4 | 69.5 | 69.5 | 69.5 | 69.5 |
| $Al_2O_3$ (mass %) | 3.5 | 3.5 | 3.5 | 3.5 | 3.4 | 3.5 | 3.5 |
| MgO (mass %) | 0.3 | 0.3 | 0.3 | 0.3 | 0.3 | 0.3 | 0.3 |
| CaO (mass %) | 9.6 | 9.6 | 9.6 | 9.6 | 9.6 | 9.6 | 9.6 |
| $Na_2O$ (mass %) | 14.7 | 14.7 | 14.8 | 14.7 | 14.7 | 14.7 | 14.7 |
| $K_2O$ (mass %) | 1.5 | 1.5 | 1.5 | 1.5 | 1.5 | 1.5 | 1.5 |
| $Fe_2O_3$ (mass %) | 0245 | 0.244 | 0.244 | 0.245 | 0.244 | 0.245 | 0.245 |
| $TiO_2$ (mass %) | 0.001 | 0.001 | 0.001 | 0.001 | 0 | 0.002 | 0.001 |
| $SnO_2$ (mass %) | 0.34 | 0.33 | 0.35 | 0.34 | 0.34 | 0.34 | 0.35 |
| $CeO_2$ (mass %) | 0.34 | 0.34 | 0.34 | 0.34 | 0.34 | 0.30 | 0.30 |
| $SO_3$ (mass %) | 0.001 | 0.001 | 0.010 | 0.001 | 0.002 | 0.001 | 0.001 |
| CoO (mass ppm) | 5.6 | 6.2 | 5.3 | 5.6 | 5.9 | 6.2 | 6.3 |
| Se (mass ppm) | 14.2 | 15.6 | 13.6 | 14.7 | 14.7 | 13.4 | 12.7 |
| Fe-Redox (%) | 61.1 | 60.8 | 60.7 | 61.1 | 59.4 | 59.6 | 58.2 |
| Tv_A (JIS R3106: 1998) (%) | 70.0 | 70.3 | 70.4 | 70.4 | 70.4 | 70.0 | 70.1 |
| Te (ISO-13837A: 2008) (%) | 48.1 | 48.4 | 48.4 | 48.3 | 48.7 | 48.4 | 48.8 |
| Tts (ISO-13837: 2008) (%) | 60.2 | 60.4 | 60.4 | 60.3 | 60.7 | 60.4 | 60.7 |
| Tuv (ISO-9050-2003) (%) | 32.1 | 32.6 | 32.3 | 32.5 | 32.4 | 32.2 | 31.9 |
| SDF (ISO-9050: 2003) (%) | 7.5 | 7.6 | 7.5 | 7.6 | 7.6 | 7.5 | 7.4 |
| L* (D65) | 84.4 | 84.6 | 84.6 | 84.6 | 84.6 | 84.4 | 84.5 |
| a* (D65) | −3.3 | −3.2 | −3.5 | −3.4 | −3.1 | −3.3 | −3.2 |
| b* (D65) | 0.2 | 0.1 | 0.4 | 0.0 | 0.3 | 0.4 | 0.4 |
| c* (D65) | 3.3 | 3.2 | 3.5 | 3.4 | 3.1 | 3.3 | 3.2 |
| Dw (nm) | 497 | 496 | 498 | 495 | 498 | 498 | 499 |
| Pe (%) | 1.7 | 1.7 | 1.7 | 1.9 | 1.5 | 1.5 | 1.4 |
| Parameter H | 231 | 232 | 232 | 232 | 224 | 229 | 221 |
| Parameter Σ | 7.4 | 7.9 | 7.1 | 7.4 | 7.7 | 8.2 | 8.2 |
| Parameter Π | 231 | 228 | 245 | 236 | 219 | 230 | 223 |

TABLE 2

|  | Case 16 | Case 17 | Case 18 | Case 19 | Case 20 | Case 21 | Case 22 | Case 23 |
|---|---|---|---|---|---|---|---|---|
| $SiO_2$ (mass %) | 69.5 | 69.5 | 69.4 | 69.5 | 69.5 | 69.5 | 69.4 | 69.4 |
| $Al_2O_3$ (mass %) | 3.5 | 3.4 | 3.4 | 3.4 | 3.4 | 3.5 | 3.5 | 3.5 |
| MgO (mass %) | 0.3 | 0.3 | 0.3 | 0.3 | 0.3 | 0.3 | 0.3 | 0.3 |
| CaO (mass %) | 9.6 | 9.6 | 9.6 | 9.6 | 9.6 | 9.6 | 9.6 | 9.6 |
| $Na_2O$ (mass %) | 14.7 | 14.7 | 14.7 | 14.7 | 14.7 | 14.6 | 14.7 | 14.7 |
| $K_2O$ (mass %) | 1.5 | 1.5 | 1.5 | 1.5 | 1.5 | 1.5 | 1.5 | 1.5 |
| $Fe_2O_3$ (mass %) | 0.247 | 0.245 | 0.238 | 0.208 | 0.209 | 0.246 | 0.226 | 0.208 |
| $TiO_2$ (mass %) | 0.001 | 0.001 | 0.001 | 0.001 | 0.001 | 0.001 | 0.001 | 0.001 |
| $SnO_2$ (mass %) | 0.34 | 0.34 | 0.35 | 0.35 | 0.35 | 0.34 | 0.35 | 0.35 |
| $CeO_2$ (mass %) | 0.30 | 0.30 | 0.39 | 0.39 | 0.39 | 0.33 | 0.42 | 0.43 |
| $SO_3$ (mass %) | 0.001 | 0.019 | 0.020 | 0.021 | 0.022 | 0.020 | 0.022 | 0.020 |
| CoO (mass ppm) | 3.8 | 9.9 | 8.8 | 7.9 | 8.9 | 5.9 | 8.6 | 14.0 |
| Se (mass ppm) | 14.0 | 12.7 | 11.1 | 10.6 | 12.9 | 12.7 | 13.8 | 13.3 |

TABLE 2-continued

|  | | | | | | | | |
|---|---|---|---|---|---|---|---|---|
| Fe-Redox (%) | 59.3 | 60.4 | 59.8 | 59.1 | 59.7 | 61.1 | 63.7 | 64.0 |
| Tv_A (JIS R3106: 1998) (%) | 70.8 | 70.0 | 71.1 | 73.3 | 72.3 | 71.0 | 71.1 | 71.0 |
| Te (ISO-13837A: 2008) (%) | 48.6 | 48.2 | 49.4 | 53.0 | 52.1 | 48.3 | 49.4 | 50.8 |
| Tts (ISO-13837: 2008) (%) | 60.6 | 60.3 | 61.1 | 63.7 | 63.1 | 60.4 | 61.1 | 62.2 |
| Tuv (ISO-9050-2003) (%) | 32.2 | 32.3 | 31.2 | 32.3 | 31.4 | 32.3 | 31.3 | 31.5 |
| SDF (ISO-9050: 2003) (%) | 7.5 | 7.5 | 7.3 | 7.5 | 7.3 | 7.5 | 7.3 | 7.3 |
| L* (D65) | 84.8 | 84.4 | 84.9 | 86.1 | 85.5 | 84.8 | 84.9 | 84.9 |
| a* (D65) | −3.3 | −3.8 | −3.8 | −3.4 | −3.3 | −4.0 | −3.6 | −3.5 |
| b* (D65) | 0.7 | 0.0 | −0.3 | −0.8 | 0.0 | 0.5 | 0.4 | −0.2 |
| c* (D65) | 3.4 | 3.8 | 3.8 | 3.5 | 3.3 | 4.0 | 3.7 | 3.5 |
| Dw (nm) | 503 | 496 | 494 | 492 | 496 | 499 | 499 | 495 |
| Pe (%) | 1.3 | 2.1 | 2.3 | 2.6 | 1.8 | 1.8 | 1.7 | 2.1 |
| Parameter H | 235 | 235 | 206 | 167 | 175 | 240 | 208 | 175 |
| Parameter Σ | 5.7 | 11.8 | 10.8 | 9.9 | 10.9 | 7.8 | 10.5 | 15.9 |
| Parameter Π | 239 | 267 | 269 | 255 | 238 | 283 | 260 | 250 |

|  | Case 24 | Case 25 | Case 26 | Case 27 | Case 28 | Case 29 | Case 30 |
|---|---|---|---|---|---|---|---|
| $SiO_2$ (mass %) | 69.5 | 69.6 | 70.6 | 72.8 | 70.8 | 69.7 | 69.6 |
| $Al_2O_3$ (mass %) | 3.5 | 3.5 | 1.9 | 0.6 | 2.0 | 3.4 | 3.5 |
| MgO (mass %) | 0.3 | 0.3 | 1.8 | 1.8 | 0.9 | 0.6 | 0.3 |
| CaO (mass %) | 9.6 | 9.6 | 9.7 | 10.1 | 10.5 | 9.2 | 9.6 |
| $Na_2O$ (mass %) | 14.7 | 14.7 | 13.6 | 13.6 | 13.4 | 14.8 | 14.7 |
| $K_2O$ (mass %) | 1.5 | 1.5 | 1.5 | 0.1 | 1.5 | 1.5 | 1.5 |
| $Fe_2O_3$ (mass %) | 0.246 | 0.245 | 0.273 | 0.273 | 0.313 | 0.227 | 0.2 |
| $TiO_2$ (mass %) | 0.001 | 0.001 | 0.002 | 0.002 | 0.001 | 0.001 | 0.05 |
| $SnO_2$ (mass %) | 0.36 | 0.34 | 0.20 | 0.20 | 0.19 | 0.19 | 0.25 |
| $CeO_2$ (mass %) | 0.33 | 0.31 | 0.45 | 0.47 | 0.41 | 0.38 | 0.1 |
| $SO_3$ (mass %) | 0.021 | 0.001 | 0.022 | 0.020 | 0.001 | 0.018 | 0.002 |
| CoO (mass ppm) | 6.9 | 3.5 | 0.4 | 4.2 | 4.4 | 8.8 | 12.0 |
| Se (mass ppm) | 11.4 | 13.2 | 7.7 | 8.3 | 6.3 | 8.7 | 5.2 |
| Fe-Redox (%) | 59.5 | 58.5 | 49.1 | 46.3 | 48.4 | 59.9 | 60 |
| Tv_A (JIS R3106: 1998) (%) | 71.1 | 71.0 | 71.5 | 71.5 | 70.8 | 71.2 | 71.4 |
| Te (ISO-13837A: 2008) (%) | 48.8 | 49.0 | 51.0 | 52.1 | 49.2 | 51.5 | 51.4 |
| Tts (ISO-13837: 2008) (%) | 60.7 | 60.9 | 62.3 | 63.1 | 61.0 | 62.6 | 61.8 |
| Tuv (ISO-9050-2003) (%) | 32.5 | 32.0 | 29.1 | 29.5 | 29.9 | 31.7 | 36.8 |
| SDF (ISO-9050: 2003) (%) | 7.6 | 7.5 | 6.8 | 6.9 | 7.0 | 7.4 | 8.6 |
| L* (D65) | 84.9 | 84.9 | 85.0 | 85.1 | 84.8 | 85.0 | 85.1 |
| a* (D65) | −4.0 | −3.2 | −2.9 | −2.7 | −3.4 | −3.1 | −2.3 |
| b* (D65) | −0.2 | 0.8 | 2.3 | 1.7 | 0.7 | 0.3 | 1.1 |
| c* (D65) | 4.0 | 3.3 | 3.7 | 3.2 | 3.5 | 3.1 | 2.5 |
| Dw (nm) | 495 | 504 | 551 | 542 | 502 | 498 | 522 |
| Pe (%) | 2.3 | 1.2 | 1.9 | 1.3 | 1.3 | 1.5 | 0.7 |
| Parameter H | 229 | 227 | 204 | 184 | 230 | 198 | 190 |
| Parameter Σ | 8.7 | 5.4 | 12.0 | 15.8 | 10.2 | 12.7 | 13.9 |
| Parameter Π | 284 | 235 | 263 | 229 | 245 | 223 | 179 |

TABLE 3

|  | Case 31 | Case 32 | Case 33 | Case 34 | Case 35 | Case 36 | Case 37 |
|---|---|---|---|---|---|---|---|
| $SiO_2$ (mass %) | 71.0 | 70.9 | 70.6 | 70.5 | 72.1 | 72.5 | 73.3-73.9 |
| $Al_2O_3$ (mass %) | 3.3 | 3.3 | 3.3 | 3.2 | 0.2 | 0.13 | 0.12-0.16 |
| MgO (mass %) | 0.1 | 0.1 | 0.1 | 0.1 | 3.8 | 3.8 | 3.6-3.8 |
| CaO (mass %) | 9.0 | 9.1 | 9.5 | 9.4 | 8.8 | 8.8 | 8.5-8.8 |
| $Na_2O$ (mass %) | 14.5 | 14.5 | 14.4 | 14.6 | 13.6 | 13.8 | 13.2-13.6 |
| $K_2O$ (mass %) | 1.5 | 1.5 | 1.5 | 1.5 | 0.1 |  | 0.031-0.034 |
| $Fe_2O_3$ (mass %) | 0.36 | 0.36 | 0.35 | 0.39 | 0.366 | 0.65 | 0.46 |
| $TiO_2$ (mass %) |  |  |  |  | 0.021 |  | 0.1 |
| $SnO_2$ (mass %) | 0.21 | 0.21 | 0.21 | 0.2 |  |  |  |
| $CeO_2$ (mass %) |  |  |  |  |  |  | 0.3 |
| $SO_3$ (mass %) | 0.003 | 0.003 | 0.016 | 0.02 | 0.079 |  |  |
| CoO (mass ppm) | 2 | 2 | 9 | 25 | 0 | 20 | 20 |
| Se (mass ppm) | 6 | 3 | 3 | 9 | 5 | 3.5 | 5 |

TABLE 3-continued

|  | Case 31 | Case 32 | Case 33 | Case 34 | Case 35 | Case 36 | Case 37 |
|---|---|---|---|---|---|---|---|
| Fe-Redox (%) | 56 | 59 | 61 | 64 | 50.3 | 30 | (47.9) |
| Tv_A (JIS R3106: 1998) (%) | 70.4 | 73.2 | 71.6 | 58.1 | 72.5 | 66.4 | 65.1 |
| Te (ISO-13837A: 2008) (%) | 45.4 | 46.4 | 45.5 | 32.3 | 49.5 | 45.6 | 42.9 |
| Tts (ISO-13837: 2008) (%) | 58.2 | 59.0 | 58.3 | 48.7 | 61.2 | 58.4 | 56.4 |
| Tuv (ISO-9050-2003) (%) | 42.3 | 47 | 48 | 37.5 | 38.3 | 30.8 | 28.3 |
| SDF (ISO-9050: 2003) (%) | 10.4 | 11.6 | 11.9 | 9.1 | 11.1 | 7.4 | 6.7 |
| L* (D65) | 84.5 | 85.9 | 85.3 | 81.5 | 85.5 | 82.6 | 82 |
| a* (D65) | −3.8 | −5.1 | −5.2 | −5.2 | −4.3 | −5.7 | −5.6 |
| b* (D65) | 1.2 | −1.7 | −2.9 | −1.7 | 0.6 | −1.6 | −2.6 |
| c* (D65) | 4.1 | 5.4 | 5.9 | 5.5 | 4.4 | 5.9 | 6.1 |
| Dw (nm) | 508 | 490 | 489 | 490 | 500 | 492 | 489 |
| Pe (%) | 1.2 | 4.3 | 5.3 | 4.8 | 1.8 | 4.5 | 5.5 |
| Parameter H | 398 | 409 | 405 | 483 | 411 | 449 | 400 |
| Parameter Σ | 2.6 | 2.6 | 9.6 | 25.6 | 24.3 | 44.3 | 43.0 |
| Parameter Π | 289 | 395 | 422 | 320 | 319 | 392 | 397 |

TABLE 4

|  | Case 38 | Case 39 | Case 40 | Case 41 | Case 42 | Case 43 | Case 44 | Case 45 |
|---|---|---|---|---|---|---|---|---|
| $SiO_2$ (mass %) | 71.0 | 72.7 | 70.9 | 70.8 | 73.1 | 71.2 | 71.1 | 71.1 |
| $Al_2O_3$ (mass %) | 2.0 | 1.0 | 2.0 | 2.2 | 1.0 | 2.0 | 2.0 | 2.0 |
| MgO (mass %) | 0.7 | 0.1 | 0.8 | 1.8 | 0.1 | 0.1 | 0.1 | 0.1 |
| CaO (mass %) | 10.6 | 10.7 | 10.5 | 9.3 | 10.7 | 10.6 | 10.7 | 10.7 |
| $Na_2O$ (mass %) | 13.6 | 14.4 | 15.2 | 14.1 | 14.3 | 14.7 | 14.7 | 14.7 |
| $K_2O$ (mass %) | 1.5 | 0.2 | 0.0 | 0.8 | 0.2 | 0.5 | 0.5 | 0.5 |
| $Fe_2O_3$ (mass %) | 0.240 | 0.290 | 0.240 | 0.240 | 0.290 | 0.270 | 0.300 | 0.300 |
| $TiO_2$ (mass %) | 0.010 | 0.010 | 0.010 | 0.010 | 0.010 | 0.002 | 0.002 | 0.001 |
| $SnO_2$ (mass %) | 0.33 | 0.36 | 0.08 | 0.34 | 0.19 | 0.19 | 0.19 | 0.19 |
| $CeO_2$ (mass %) | 0.27 | 0.16 | 0.26 | 0.33 | 0.00 | 0.42 | 0.40 | 0.40 |
| $SO_3$ (mass %) | 0.001 | 0.049 | 0.015 | 0.001 | 0.050 | 0.014 | 0.019 | 0.020 |
| CoO (mass ppm) | 0.0 | 3.9 | 2.0 | 5.3 | 4.3 | 3.8 | 3.6 | 3.4 |
| Se (mass ppm) | 14.0 | 6.6 | 5.3 | 12.1 | 6.6 | 7.6 | 6.8 | 6.1 |
| Fe-Redox (%) | 54.0 | 50.9 | 47.1 | 67.0 | 61.2 | 65.9 | 58.7 | 60.1 |
| Tv_A (JIS R3106: 1998) (%) | 73.0 | 73.5 | 73.7 | 71.8 | 72.8 | 71.7 | 71.4 | 71.8 |
| Te (ISO-13837A: 2008) (%) | 50.2 | 51.3 | 52.8 | 50.3 | 51.8 | 49.0 | 49.4 | 49.2 |
| Tts (ISO-13837: 2008) (%) | 61.7 | 62.5 | 63.6 | 61.8 | 62.8 | 60.9 | 61.1 | 61.0 |
| Tuv (ISO-9050-2003) (%) | 33.6 | 35.0 | 33.7 | 33.5 | 46.4 | 29.6 | 29.5 | 29.7 |
| SDF (ISO-9050: 2003) (%) | 7.8 | 8.3 | 7.8 | 7.8 | 11.7 | 6.9 | 6.9 | 7.0 |
| L* (D65) | 85.8 | 86.0 | 86.1 | 85.3 | 88.7 | 85.1 | 85.0 | 85.2 |
| a* (D65) | −3.2 | −3.9 | −3.7 | −3.8 | −2.7 | −3.5 | −3.1 | −3.4 |
| b* (D65) | 1.1 | 0.0 | 0.6 | −0.2 | 0.4 | 1.1 | 1.1 | 0.6 |
| c* (D65) | 3.4 | 3.9 | 3.8 | 3.8 | 2.7 | 3.7 | 3.3 | 3.5 |
| Dw (nm) | 511 | 496 | 500 | 495 | 503 | 509 | 512 | 501 |
| Pe (%) | 1.0 | 2.1 | 1.5 | 2.3 | 1.2 | 1.1 | 0.9 | 1.4 |
| Parameter H | 196 | 241 | 178 | 220 | 336 | 244 | 252 | 258 |
| Parameter Σ | 4.5 | 4.3 | 7.1 | 16.8 | 4.9 | 4.2 | 4.0 | 3.8 |
| Parameter Π | 248 | 287 | 280 | 271 | 197 | 263 | 235 | 250 |

|  | Case 46 | Case 47 | Case 48 | Case 49 | Case 50 | Case 51 | Case 52 |
|---|---|---|---|---|---|---|---|
| $SiO_2$ (mass %) | 71.0 | 71.0 | 71.1 | 71.3 | 71.1 | 70.5 | 70.9 |
| $Al_2O_3$ (mass %) | 2.0 | 2.0 | 2.0 | 2.0 | 2.0 | 2.0 | 1.0 |
| MgO (mass %) | 0.1 | 0.1 | 0.1 | 0.1 | 0.1 | 0.4 | 0.4 |
| CaO (mass %) | 10.7 | 10.7 | 10.6 | 10.6 | 10.6 | 10.6 | 10.6 |
| $Na_2O$ (mass %) | 14.7 | 14.8 | 14.7 | 14.6 | 14.7 | 14.0 | 14.0 |
| $K_2O$ (mass %) | 0.5 | 0.5 | 0.5 | 0.5 | 0.5 | 1.4 | 1.4 |
| $Fe_2O_3$ (mass %) | 0.297 | 0.272 | 0.274 | 0.273 | 0.274 | 0.220 | 0.200 |
| $TiO_2$ (mass %) | 0.001 | 0.001 | 0.001 | 0.001 | 0.001 | 0.010 | 0.010 |
| $SnO_2$ (mass %) | 0.19 | 0.18 | 0.19 | 0.19 | 0.19 | 0.400 | 0.800 |
| $CeO_2$ (mass %) | 0.49 | 0.50 | 0.45 | 0.50 | 0.50 | 0.450 | 0.700 |
| $SO_3$ (mass %) | 0.023 | 0.017 | 0.018 | 0.013 | 0.016 | 0.03 | 0.01 |
| CoO (mass ppm) | 3.0 | 2.4 | 3.3 | 3.1 | 4.1 | 5.0 | 6.0 |

TABLE 4-continued

| | | | | | | | |
|---|---|---|---|---|---|---|---|
| Se (mass ppm) | 6.8 | 7.8 | 7.0 | 7.2 | 7.0 | 5.0 | 16.0 |
| Fe-Redox (%) | 56.3 | 61.3 | 64.1 | 66.0 | 64.9 | 54.5 | 85.0 |
| Tv_A (JIS R3106: 1998) (%) | 71.6 | 71.4 | 72.0 | 71.7 | 72.0 | 73.6 | 67.9 |
| Te (ISO-13837A: 2008) (%) | 49.4 | 49.6 | 49.7 | 49.0 | 49.5 | 50.1 | 42.5 |
| Tts (ISO-13837: 2008) (%) | 61.1 | 61.3 | 61.4 | 60.8 | 61.2 | 61.6 | 56.1 |
| Tuv (ISO-9050-2003) (%) | 28.1 | 28.0 | 29.4 | 28.4 | 28.8 | 28.0 | 27.0 |
| SDF (ISO-9050: 2003) (%) | 6.6 | 6.6 | 6.9 | 6.7 | 6.8 | 6.6 | 6.4 |
| L* (D65) | 85.1 | 85.0 | 85.3 | 85.1 | 85.3 | 89.0 | 86.5 |
| a* (D65) | −3.1 | −3.0 | −3.3 | −3.4 | −3.2 | −2.7 | −3.9 |
| b* (D65) | 1.4 | 1.9 | 1.3 | 1.5 | 0.8 | −0.2 | −3.3 |
| c* (D65) | 3.4 | 3.6 | 3.5 | 3.7 | 3.3 | 2.7 | 5.1 |
| Dw (nm) | 519 | 540 | 515 | 518 | 504 | 508 | 489 |
| Pe (%) | 0.9 | 1.3 | 1.0 | 1.0 | 1.1 | 0.9 | 4.0 |
| Parameter H | 226 | 218 | 237 | 234 | 230 | 147 | 135 |
| Parameter Σ | 3.4 | 2.8 | 3.7 | 3.5 | 4.5 | 7.6 | 8.6 |
| Parameter Π | 242 | 256 | 252 | 268 | 241 | 199 | 344 |

X-ray intensity of each component on the surface of the glass plate obtained above was measured using a fluorescent X-ray spectrometry (XRF) (ZSX100e manufactured by Rigaku Corporation), quantitative analysis was conducted and the above compositions were confirmed. Furthermore, transmittance was measured every 1 nm by a spectrophotometer (Lambda 950 manufactured by Perkin Elmer), and Fe-Redox was determined from the transmittance at a wavelength of 1150 nm. The amount of the divalent iron determined from the transmittance at a wavelength of 1150 nm was converted into a mass of $Fe_2O_3$ as described above and was used for the calculation of Fe-Redox. Furthermore, optical properties shown in the tables were obtained.

It is found from Table 1 that the soda lime glass plates in Cases 1 to 30 and 38 to 51 maintain high visible light transmittance while having high heat-insulating property, that is, a total solar transmittance Tts of 63.7% or less, and achieve gray color represented by the c* value of 4 or less.

On the other hand, the soda lime glass plates in Cases 31 to 37 and 52 meet the criteria of heat-insulating property, but the c* value exceeds 4 and the desirable achromatic color gray is not achieved. Furthermore, the visible light transmittance (Cases 34, 36, 37 and 52), the ultraviolet-screening property (Cases 31 to 35) and the fining property (Cases 36 and 37) are insufficient, and the balance of desirable properties as window glasses of vehicles is not obtained.

Although the present invention is described in detail and by reference to the specific embodiments, it is apparent to one skilled in the art that various modifications or changes may be made without departing the spirit and scope of the present invention.

This application is based on Japanese Patent Application No. 2016-206717 filed on Oct. 21, 2016 and Japanese Patent Application No. 2017-096950 filed on May 16, 2017, the contents of which are incorporated herein by reference.

INDUSTRIAL APPLICABILITY

The soda lime glass plate of the present invention has heat-insulating property, visible light transmittance and gray color. Therefore, the soda lime glass plate is useful as window glasses of vehicles, particularly automobiles, and can be applied to other uses in which those properties are required.

The invention claimed is:

1. A soda lime glass plate, comprising, in mass % on the basis of oxides:
   $SiO_2$: 65 to 78%;
   $Al_2O_3$: 0 to 5%;
   CaO: 5 to 12%;
   MgO: 0 to 10%;
   $Na_2O$: 5 to 18%; and
   $K_2O$: 0 to 5%,
   wherein the soda lime glass plate has:
   a total sulfur content in terms of $SO_3$ of 0.001 to 0.2% in mass % on the basis of oxides;
   a total iron content in terms of $Fe_2O_3$ of 0.15 to 0.4% in mass % on the basis of oxides;
   a total tin content in terms of $SnO_2$ of 0.02 to 1% in mass % on the basis of oxides;
   a selenium content of 5 to 20 ppm in mass ppm;
   a total cobalt content in terms of CoO of 2 to 15 ppm in mass ppm on the basis of oxides;
   a mass proportion of a divalent iron in terms of $Fe_2O_3$ in the total iron in terms of $Fe_2O_3$ of 45 to 70%;
   a visible light transmittance Tv_A specified in JIS R3106: 1998 of 70% or more as a conversion value for a 3.85 mm-thickness glass plate;
   a total solar transmittance Tts specified in ISO-13837A: 2008 of 63.7% or less as a conversion value for a 3.85 mm-thickness glass plate; and
   c* in the L*a*b* color space specified in JIS Z8781-4: 2013 of 4 or less as a conversion value for a 3.85 mm-thickness glass plate.

2. The soda lime glass plate according to claim 1, comprising, in mass % on the basis of oxides:
   $SiO_2$: 67 to 77%;
   $Al_2O_3$: 0.1 to 4%;
   CaO: 6 to 11.5%;
   MgO: 0.1 to 8%;
   $Na_2O$: 8 to 16%; and
   $K_2O$: 0.05 to 3%.

3. The soda lime glass plate according to claim 1, having the selenium content of 6 to 17 ppm in mass ppm.

4. The soda lime glass plate according to claim 1, having the total cobalt content in terms of CoO of 3 to 10 ppm in mass ppm on the basis of oxides.

5. The soda lime glass plate according to claim 1, having the total cobalt content in terms of CoO of 4 to 15 ppm in mass ppm on the basis of oxides.

6. The soda lime glass plate according to claim 1, having a total cerium content in terms of $CeO_2$ of 0.1 to 2.0% in mass % on the basis of oxides.

7. The soda lime glass plate according to claim 1, having a total titanium content in terms of $TiO_2$ of 0.001 to 0.8% in mass % on the basis of oxides.

8. The soda lime glass plate according to claim 1, having the total iron content in terms of $Fe_2O_3$ of 0.15 to 0.32% in mass % on the basis of oxides.

9. The soda lime glass plate according to claim 1, having the mass proportion of a divalent iron in terms of $Fe_2O_3$ in the total iron in terms of $Fe_2O_3$ of 57 to 70%.

10. The soda lime glass plate according to claim 1, wherein a parameter H defined as follows satisfies the relationship of $140 \leq H \leq 350$, $$H=\{491\times[Fe^{2+}]+54.8\times[Fe^{3+}]-17.2\times[SnO_2]-45.2\times[CeO_2]+130\times[SO_3]-0.390\times[CoO]+0.608\times[Se]-3.95\}\times[Thickness]$$

wherein $[Fe^{2+}]$ is a $Fe^{2+}$ content in terms of $Fe_2O_3$ in mass %, $[Fe^{3+}]$ is a $Fe^{3+}$ content in terms of $Fe_2O_3$ in mass %, $[SnO_2]$ is the total tin content in terms of $SnO_2$ in mass %, $[CeO_2]$ is a total cerium content in terms of $CeO_2$ in mass %, $[SO_3]$ is the total sulfur content in terms of $SO_3$ in mass %, $[CoO]$ is the total cobalt content in terms of CoO in mass ppm, $[Se]$ is the selenium content in mass ppm, and $[Thickness]$ is a thickness of the glass plate in mm.

11. The soda lime glass plate according to claim 1, wherein a parameter $\Sigma$ defined as follows satisfies the relationship of $\Sigma \leq 25$, $$\Sigma=[CoO]+6.4\times[MgO]$$

wherein $[CoO]$ is the total cobalt content in terms of CoO in mass ppm, and $[MgO]$ is the MgO content in mass %.

12. The soda lime glass plate according to claim 1, having an ultraviolet transmittance Tuv specified in ISO-9050:2003 of 35% or less as a conversion value for a 3.85 mm-thickness glass plate.

13. The soda lime glass plate according to claim 1, having a coordinate in the L*a*b* color space specified in JIS Z8781-4:2013 which satisfies the following relationships as a conversion value for a 3.85 mm-thickness glass plate, $$-4 \leq a^* \leq 1, \text{ and}$$

$$-1 \leq b^* \leq 4.$$

14. The soda lime glass plate according to claim 1, having:
an excitation purity Pe specified in JIS Z8701:1999 of 2.5% or less as a conversion value for a 3.85 mm-thickness glass plate; and
a dominant wavelength Dw of transmitted light specified in JIS Z8701:1999 of 485 nm to 565 nm as a conversion value for a 3.85 mm-thickness glass plate.

15. The soda lime glass plate according to claim 1, having an excitation purity Pe specified in JIS Z8701:1999 of 1.5% or less as a conversion value for a 3.85 mm-thickness glass plate.

16. The soda lime glass plate according to claim 1, having a solar direct transmittance Te specified in ISO-13837A:2008 of 66% or less as a conversion value for a 3.85 mm-thickness glass plate.

* * * * *